June 13, 1961 C. K. STROBEL ET AL 2,988,140
TEMPERATURE CONTROL DEVICE
Filed Oct. 14, 1958 2 Sheets-Sheet 2

United States Patent Office 2,988,140
Patented June 13, 1961

2,988,140
TEMPERATURE CONTROL DEVICE
Charles K. Strobel, Pittsburgh, and Victor Weber, Greensburg, Pa., assignors to Robertshaw-Fulton Controls Company, Richmond, Va., a corporation of Delaware
Filed Oct. 14, 1958, Ser. No. 767,204
5 Claims. (Cl. 158—144)

This invention relates to temperature control devices for heating appliances and more particularly to devices responsive to the internal temperature of meat or like material being cooked or heated by the appliances.

It is a general object of this invention to combine the control of the heating appliance with means responsive to a selective internal temperature of the material being heated by the appliance.

Another object of this invention is to shut off the supply of heat producing medium when the internal temperature of the material being heated reaches a predetermined degree.

A further object of this invention is to allow removal of the means responsive to the internal temperature of the material being heated when it is not desired to control the progress of the heating in accordance with the internal temperature of the material.

A further object of this invention is to mechanically interconnect the temperature control device with the shut-off means for the heating appliance.

Briefly stated, in accordance with one aspect of this invention, a temperature sensitive element is adapted to be inserted into the interior of a material being heated in such a manner that contraction and expansion of the temperature sensitive element will produce a movement which is amplified to actuate a latch and detent mechanism. This mechanism actuates motion transmitting means connected to a control device which regulates the supply of heat producing medium to the heater. The motion transmitting means comprises two sections, which are connected to each other to render the control device and temperature responsive actuator operative. By providing adjusting means for the latch and detent mechanism, the point at which the control device will shut off the heat producing medium can be varied dependent upon the will of the operator.

Other objects and advantages will become apparent from the following description taken in connection with the accompanying drawings, wherein.

Figure 1:
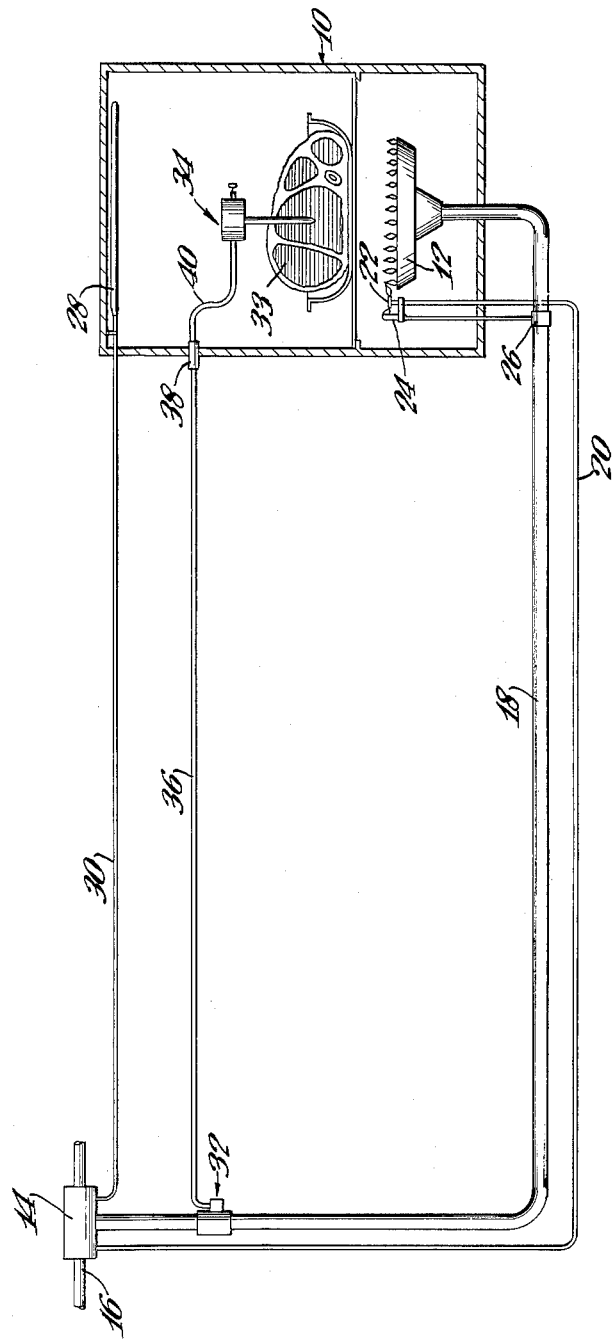
FIG. 1 is a schematic view of a system embodying this invention.

Referring to the drawings, FIG. 1 shows an oven 10 having a main burner 12, disposed within a lower portion thereof, to provide the necessary heat. Primary control valve 14 regulates the supply of fuel from an inlet 16 to oven 10, and is of the usual type characterized by having an "off" position and an "on" position adapted to regulate the oven temperature at a preselected degree. Valve means 14 further controls the supply of fuel through a line 20 to a pilot burner 22 disposed adjacent main burner 12 to ignite fuel passing through the main burner. Adjacent to pilot burner 22, safety control means 24 controls a safety shut-off valve 26 in such a manner that no fuel will be supplied to main burner 12 if a flame does not burn at pilot burner 22. A temperature sensing element 28 is operatively connected through a capillary tube 30 to valve means 14 and is adapted to regulate the amount of fuel supplied to main burner 12 in accordance with the internal temperature of oven 10.

A control device 32, connected to a conduit 18 to further regulate the supply of fuel to main burner 12, is operatively connected to a temperature responsive actuator 34 by motion transmitting means 36 connected through an oven wall plug connector 38 to motion transmitting means 40 which is in turn connected to actuator 34.

Actuator 34 is adapted to be inserted into a roast 33 and is so constructed that when the internal temperature of roast 33 reaches a predetermined degree, temperature responsive actuator 34 will cause control device 32 to shut off the fuel being supplied to burner 12 through conduit 18.

Figure 2:
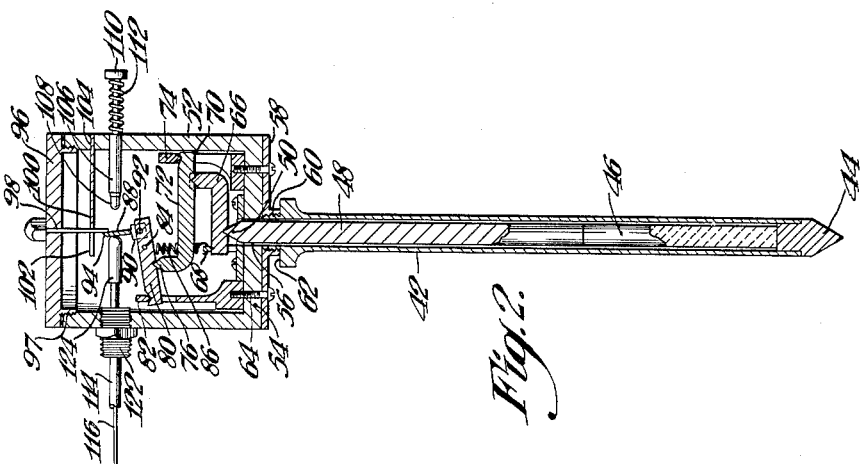
FIG. 2 is a longitudinal cross-section of the temperature responsive device.

In FIG. 2, temperature responsive actuator 34, sometimes referred to as a meat probe, comprises a meat probe tube 42 having a skewer point 44 attached to one end thereof. A temperature sensing element 46 is disposed within tube 42 having one end in contact with skewer point 44 and the other end abutting a rod 48 which has an end 50 extending into a cylindrical housing 52. It is preferable that tube 42 and rod 48 be formed of material having the same or nearly the same coefficient of thermal expansion and that temperature sensing element 46 be formed of material having a different coefficient of thermal expansion. By selecting a material for element 46 which has a negative coefficient of thermal expansion, increasing temperature will cause element 46 to contract and thereby allow pointed end 50 to move downwardly as shown in FIG. 2. The different coefficients of thermal expansion between tube 42 and rod 48 and element 46 provide a compensating effect where element 46 is at a different temperature than the upper portions of tube 42 and rod 48.

A bottom wall 54 of cylindrical housing 52 has a central aperture 56 therein adapted to allow rod 48 to pass therethrough. A bottom plate 58 is attached to wall 54 by screw means 64. Extending from the bottom of plate 58 is a collar 60 which is internally threaded to receive a threaded section of tube 42. A shoulder 62 abuts a section of collar 60 to limit upward movement thereof. Thus, end 50 is movable relative to wall 54 upon the expansion and contraction of temperature sensing element 46.

End 50 is in contact with a lever 66 pivoted about a fulcrum formed by a stationary knife edge 68. Since end 50 contacts lever 66 at a point between knife edge 68 and an end 70, a small movement at this point will result in a larger movement of end 70. A lever 72 is pivoted about a stationary knife edge 74 in such a manner that end 70, which contacts lever 72 at a lesser distance from fulcrum 74 than an end 76, will cause end 76 to move a greater distance than that of the point at which end 70 contacts lever 72. In turn, end 76 engages a lever 80, pivoted about a knife edge 82, in such a manner that a small movement at the point where end 76 contacts lever 80 will result in a larger movement of a pin 92 connected to lever 80 at the end away from fulcrum 82. A spring 86 is connected to lever 80 through a pin 84 and has the other end connected to knife edge 68 in such a manner that it biases the levers 80, 72, and 66 and rod 48 downwardly as shown in FIG. 2. This series of levers forms a motion amplifying means whereby a small movement at the point where end 50 contacts lever 66 will result in a much greater movement of pin 92. If, for example, end 50 moves downwardly, spring 86, acting through lever 80, causes lever 80 to pivot clockwise, lever 72 to pivot counterclockwise, and lever 66 to pivot clockwise. However, should end 50 move in an upward direction, it will cause reversal of the above motion which results in lever 80 pivoting counterclockwise.

A latch member 88 has a rectangular end portion 90 pivotally connected to lever 80 by pin 92. The upper portion of latch 88 has an inclined cam surface 94 formed thereon for a purpose described hereafter. Pin 84 further acts as a stop member for latch 88 by contacting rectangular portion 90 when latch 88 pivots in a clockwise direction.

An adjusting dial 96 is rotatably connected to housing 52 by threads 97. A detent 98 has one end permanently attached to dial 96 in such a manner that detent 98 moves up and down when dial 96 is screwed into and out of cylindrical housing 52. A stop member 100 has one end 104 connected to cylindrical housing 52 and has a slotted end 102 extending outwardly into the housing chamber. Detent 98 is disposed within the slot in such a manner that, as shown in FIG. 2, detent 98 may pivot clockwise through the slot 102 but is prevented from pivoting counterclockwise by contacting stop member 100.

If latch 88 is in engagement with detent 98, as shown in FIG. 2, stop 100 will hold detent 98 against further movement and thereby prevent latch 88 from rotating in a clockwise direction until such time as it is no longer in engagement with detent 98. If, however, latch 88 is to the right of detent 98, and is rotated counterclockwise, inclined surface 94 may contact the bottom of detent 98 urging it in a clockwise direction. Because of slot 102, the flexible detent 98 may rotate in a clockwise direction until it rides over inclined surface 94. It is apparent that the position of latch 88 is dependent on the temperature of element 46. By varying the height of detent 98, the temperature at which latch 88 will be disengage from detent 98 will be changed.

A tube 106 is connected to housing 52 and has a reciprocable plunger 108 passing therethrough. Connected to one end of member 108 is a push button 110 which engages a spring 112 to urge plunger 108 outwardly. A stop member (not shown) is formed on plunger 108 and contacts tube 106 to prevent spring 112 from forcing plunger 108 from tube 106. This reset mechanism is adapted to be engageable with latch 88 so that depressing button 110 causes plunger 108 to move inwardly engaging latch member 88. Should latch member 88 be to the right of detent 98, the inward movement of plunger 108 will cause latch 88 to pivot counterclockwise, and if depressed a sufficient amount, plunger 108 will cause latch 88 to pass under detent 98, in the manner previously described, to reset latch 88 to the position shown in FIG. 2.

Motion transmitting means 40 is formed with a flexible tube 114 having a wire 116 movably extending therethrough. Stops 118 and 120 are welded to tube 114 and define the longitudinal limits of movement of a rotatable fastener 126 rotatably mounted therebetween. Wire 116 has an enlarged end portion 124 adapted to engage latch 88. When the detent member 98 holds latch 88 in the position shown in FIG. 2, member 124 and wire 116 are prevented from moving from left to right but are able to move from right to left.

Tube 114 passes through a threaded fastener 122 and is held stationary with respect to housnig 52 by threaded fastener 122. The other end of wire 116 extends from tube 114 beyond stop 120 and is adapted to engage a cable 136 in a manner hereinafter described.

Figure 3:
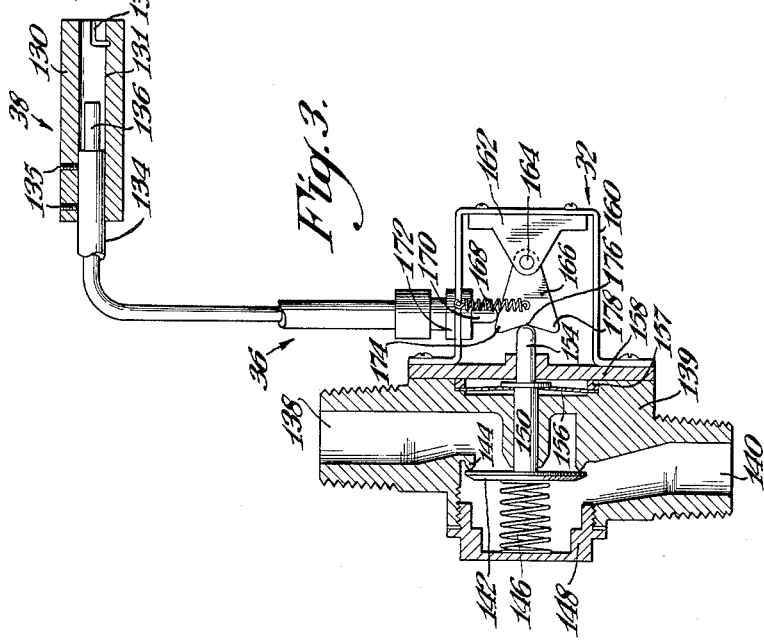
FIG. 3 is a longitudinal cross-section of the control device.

An oven wall plug connector 38, shown in FIG. 3, comprises a sleeve member 130 adapted to be mounted and pass through a wall of oven 10. Disposed within a passage 131 is a tube 134, held in place by set screws 135, through which a flexible cable 136 movably extends. Slots 132, formed in one end of sleeve member 130, are adapted to receive pins 128 which extend from rotatable fastener 126 in such a manner that fastener 126, stop 120, and wire 116 may be inserted into interior 131 and pins 128 may be inserted into grooves 132 and rotated to rigidly attach fastener 126 and motion transmitting means 40 to plug connector 38 and motion transmitting means 36.

Control device 32, adapted to be connected into fuel line 18, has a casing 139 formed with an inlet opening 138 and an outlet opening 140. A valve member 142 is biased against a valve seat 144 by spring means 146 extending between a cap 148 and valve member 142. Valve member 142 permits fluid to flow from inlet 138 to outlet 140 when it is not seated against valve seat 144; otherwise, flow is prevented. A reciprocable valve operating pin 150 extends through casing 139 and terminates in a cam pin 154. A flexible diaphragm 156 cooperates with valve pin 150 and prevents any fluid from leaking from control device 32. A plate 158 holds flexible diaphragm 156 in place by means of a member 157 disposed between 158 and 156 and the casing.

A bracket 160 and a plate 158 are attached to casing 139 by screws. A support member 162, having a pivot pin 164 extending therethrough, supports a pivoting cam means 166 in such a manner that it actuates cam pin 154. Extending between cam 166 and bracket 160 is a spring 168 which, as shown in FIG. 3, biases cam 166 in a clockwise direction.

Cam 166 has a cam surface formed thereon by projections 174 and 178 and a depression 176. Cam pin 154 is biased by spring 146 operating through valve operating pin 150 against the cam surface. When resting against projections 174 or 178, cam pin 154 holds valve member 142 in an unseated position with respect to valve seat 144 and allows fluid to flow through the casing 139; however, if cam pin 154 rests in depression 176, valve member 142 is seated against valve seat 144 and thereby prevents any fluid from flowing through control device 32.

Motion transmitting means 36 has one end of cable 136 terminating in a rod 170 which is adapted to rest against cam 166. A fastening means 172 is connected to bracket 160 and thereby holds tube 134 stationary with respect to the bracket yet permit cable 136 and rod 170 to movably extend through tube 134.

During normal cooking operations, temperature responsive actuator 34 is not used. In this case, spring 168 urges cam 166 clockwise until projection 178 contacts cam pin 154 and holds valve member 142 in an open position whereby fuel may flow through casing 139. In this position, the normal control of oven 10 is accomplished by main control valve 14.

When, however, it is desired to cook a roast and control the progress of cooking in accordance with the internal temperature of the roast, it is necessary to operatively connect temperature responsive actuator 34 to control device 32. To do this, calibrated dial 96 is set to the desired position and tube 42 is inserted into roast 33 so that element 46 is disposed within the area of roast 33 wherein the desired degree of "doneness" is wanted. Next, rotatable fastener 126 is inserted into sleeve 130 and pins 128 are rotated in slots 132 to lock the elements together. Concurrently, wire 116 engages cable 136 causing it to move inwardly with respect to sleeve member 130 and thereby cause rod 170 to rotate cam 166 in a counterclockwise direction. Cam 166 will be rotated until cam pin 154 rests in depression 176 or on projection 174, dependent upon the position of latch 88 and detent 98.

In order for valve member 142 to be open and permit fluid to flow through control device 32, it is necessary to engage latch 88 by detent 98. If not already engaged, it is necessary to reset the mechanism by depressing button 110 causing plunger 108 to rotate latch 88 under-riding detent 98 until they become engaged. Rotation of latch 88 to this position causes motion transmitting means 38 and 40 to rotate cam 166 until projection 174 contacts pin 154 causing valve member 142 to open.

At this point, oven 10 is turned on by means of control means 14 and gas flows through conduit 18 and control device 32 to main burner 12. Pilot burner 22 ignites the fuel and as the temperature of oven 10 and roast 33 increases, temperature sensing element 46, having a negative coefficient of expansion, contracts causing end 50 to move downwardly. This movement is amplified through lever 66, lever 72 and lever 80 causing pivoted latch 88 to move downwardly.

Upon reaching the desired temperature, latch 88 will be disengaged from detent 98 permitting rod 124, wire 116, cable 136, and rod 170 to move because of spring 168 and thereby rotate cam 166 until cam pin 154 rests in depression 176 whereupon valve 146 will be seated against valve seat 144 cutting off the flow of fuel through line 18 and control device 32 to main burner 12. At this point, the roast is cooked and may be removed from the oven.

If it is desired to immediately re-use the device, it is only necessary to reset latch 88 and detent 98 and insert tube 42 into another roast. It is essential, however, that temperature sensing element 46 cool sufficiently so that expansion thereof can cause rod 48 and the motion amplifying means to expand so that latch 88 will be engageable with detent 98.

To remove temperature responsive actuator 34 from control device 32, merely disengage fastener 126 from sleeve 130 whereupon cam 166 will rotate causing projection 178 to open valve member 142.

It is understood that many changes may be made in the combination and arrangement of parts and in the details of construction within the scope of the appended claims without departing from the invention disclosed herein.

We claim:

1. A control device actuator for cooking meat comprising a tube having a skewer point connected to one end thereof whereby said tube is adapted for insertion into the meat, temperature sensitive means disposed within said tube having a different coefficient of thermal expansion from said tube, a rod disposed within said tube having one end thereof extending from said tube, said rod being so constructed and arranged that changes in temperature of said temperature sensitive means will cause relative movement between said tube and said rod, motion amplifying means cooperating with said rod adapted to cause a larger movement than said relative movement, pivotal elongated latch means connected to said motion amplifying means and being adapted to move therewith and having first and second positions, detent means engaging the outer end of said latch means for controlling movement of said latch means between said positions, and motion transmitting means engageable with an intermediate portion of said latch means to bias the outer end of said latch means into engagement with said detent means when said latch means is in said first position, said motion transmitting means being released when said temperature sensitive means causes a predetermined movement of said motion amplifying means to thereby release said latch means from engagement with said detent means so that said latch means moves to said second position.

2. A control device actuator for cooking meat comprising a tube having a skewer point connected to one end thereof whereby said tube is adapted for insertion into the meat, temperature sensitive means disposed within said tube having a different coefficient of thermal expansion from said tube, a rod disposed within said tube having one end thereof extending from said tube, said rod being so constructed and arranged that changes in temperature of said temperature sensitive means will cause relative movement between said tube and said rod, motion amplifying means cooperating with said rod and adapted to cause a larger movement than said relative movement, pivotable elongated latch means connected to said amplifying means and being adapted to move therewith and having first and second positions, motion transmitting means biased for engagement with an intermediate portion of said latch means to prevent said motion transmitting means from moving when said latch means is in said first position and to release said motion transmitting means when said latch means moves from said first to said second positions, longitudinally adjustable flexible detent means pivotally movable in a direction substantially opposite to said biased motion transmitting means and engaging the outer end of said latch means for controlling movement of said latch means between said positions, and reset means moving said latch means from the second position to the first position to operatively engage said latch means with said detent means and said motion transmitting means.

3. A temperature control device comprising in combination temperature responsive means adapted to produce a movement proportional to temperature changes thereof, motion amplifying means connected to said temperature responsive means and being adapted to amplify the amount of said movement, pivotable elongated latch means connected to said amplifying means and being adapted to move therewith and having first and second positions, motion transmitting means biased for engagement with an intermediate portion of said latch means to prevent said motion transmitting means from moving when said latch means is in said first position and to release said motion transmitting means when said latch means moves from said first to said second positions, longitudinally adjustable flexible detent means slidably engaging said latch means in said first position, stop means abutting substantially intermediate the length of said detent means for allowing pivotal movement of said detent means in a direction substantially opposite to said biased motion transmitting means, said detent means engaging the outer end of said latch means for controlling movement of said latch means between said first and second positions, and reset means moving said latch means from the second position to the first position to to operatively engage said latch with said detent means and said motion transmitting means.

4. The device defined in claim 3 wherein said stop means comprises an elongated member having a slot portion in the free end, said slot portion being adapted to engage an intermediate portion of said flexible detent means when said latch means is in said first position, said reset means engaging said latch means in the second position causing said detent means to move in said slot relative to the longitudinal axis of said elongated member whereby said detent means becomes a substantially rigid abutment for said latch means in said first position and is movable in one direction when said latch means is moved from said second position to said first position.

5. A control system for the supply of a heat producing medium to a heating chamber comprising in combination control means located exterior of said heating chamber and movable between positions adapted for controlling the flow of a heat producing medium, adjustable temperature responsive means located within said chamber in a portable casing, motion transmitting means operatively connecting said control means with said temperature responsive means, connector means in a wall of said chamber, a flexible means for the portion of the motion transmitting means disposed between said connector means and said control means, a wire means abutting said flexible means in its operative position and disposed between said connector means and said temperature responsive means, and a fastener means detachably insertable into said connector means with said wire means movably extending therethrough to mechanically interconnect the control means with the adjustable temperature responsive means in said portable casing to operate said control means at various determinable temperatures.

References Cited in the file of this patent

UNITED STATES PATENTS

| | | |
|---|---|---|
| 1,845,027 | Lonergan | Feb. 16, 1932 |
| 1,881,638 | Johnson | Oct. 11, 1932 |
| 2,019,008 | Hauser | Oct. 29, 1935 |
| 2,023,276 | Lovekin et al. | Dec. 3, 1935 |
| 2,568,916 | Godefroy | Sept. 25, 1951 |
| 2,610,678 | Eskin et al. | Sept. 16, 1952 |